March 13, 1934.    E. J. D'AOUST ET AL    1,950,714
CONTAINER AND COOLER
Filed July 28, 1932

INVENTORS
E. J. D'Aoust
H. L. Dickens
BY E. J. Fetherstonhaugh
ATTORNEY

Patented Mar. 13, 1934

1,950,714

UNITED STATES PATENT OFFICE 1,950,714

CONTAINER AND COOLER

Ernest Joseph D'Aoust, Windsor, Ontario, Canada, and Herbert Lawrence Dickens, Detroit, Mich.

Application July 28, 1932, Serial No. 625,500

1 Claim. (Cl. 62—91.5)

The invention relates to a container and cooler, as described in the present specification and illustrated in the accompanying drawing that forms part of the same.

The invention consists essentially of the unit combining the means for refrigerating and the container as pointed out in the claim for novelty following a description in detail of the parts making up the unit.

The objects of the invention are to cool liquids such as beer, especially contents being continually drawn upon thereby making it possible to maintain the volume of liquid in constant use in a palatable condition while a considerable volume remains unchilled, which are ideal conditions for dispensing beer and many liquids, especially where they are sold by the glass; to facilitate the transport of beer and some other beverages, particularly those beverages liable to deterioration from changes of temperature and therefore deliver the container with its contents in as fit a state as when it left the brewery, factory or other production centre; to utilize dry ice, artificial ice, natural ice or chemical refrigerants to the best advantage for cooling containers and introduce the cooling medium with ease; and generally to provide for restaurants, hotels, merchants, dwellings and places of entertainment, a convenient form of container from which the beverage will be delivered in a wholesome condition and which will not materially add to the cost of the invention to the consumer.

In the drawing, Figure 1 is an elevational view of a container having a refrigerant compartment at the bottom thereof.

Like numerals of reference indicate corresponding parts in the various figures.

Figure 1:
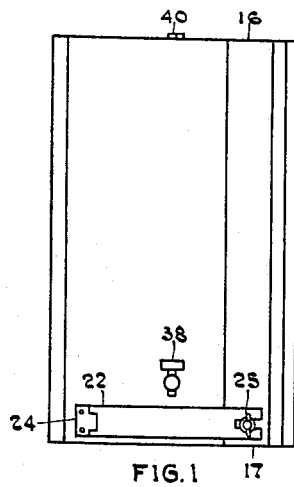
Figure 2:
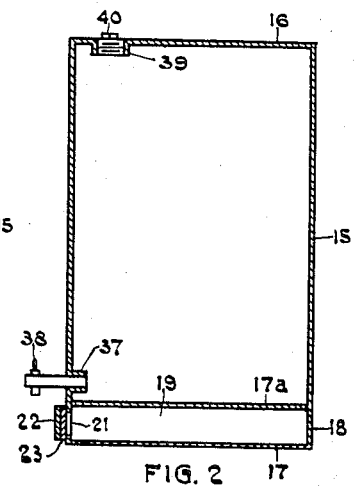
Figure 2 is a vertical elevational view of this container.

Referring to the drawing, the numeral 15 indicates the container preferably of steel having the top 16, the bottom 17a and the extension wall 18 beyond the inner bottom 17a to form a refrigerant chamber 19 having its own bottom 17 which in this case forms the outside bottom of the complete vessel, the chamber 19 having in the extension wall an access opening 21 closed by the door 22, which is suitably packed at 23 to engage the edge of the opening 20 and maintain the chamber 19 air tight, said door having the hinge 24 at one end securing it to the wall and the fastening device 25 at the other end.

It will thus be seen that the drum forms the casing for the container 15 and the chamber 19, the chamber 19 being divided from the container 15 by the inner bottom 17a thereby providing for the dry ice a chamber which will cool a considerable portion of the body of the beer in the vessel, certainly enough of the beer will always be cool and palatable while the remainder or the upper portion of the beer will be replacing the beer that is withdrawn from time to time.

Figure 4:
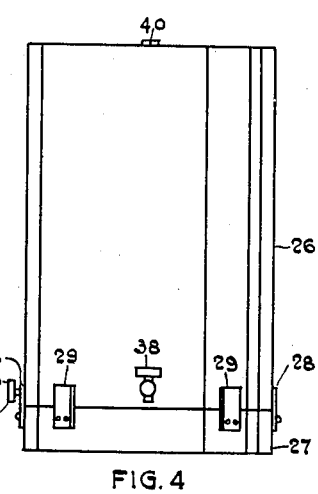
Figure 4 is an elevational view of the container in which the refrigerant compartment is separable therefrom, and fastened by a suitable locking device.
Figure 3:
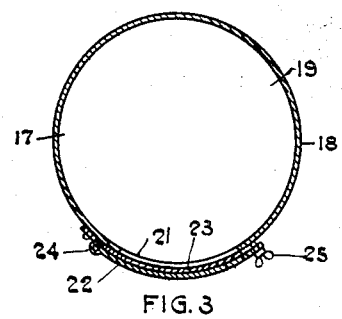
Figure 3 is a cross sectional view.

In Figure 4 the drum 26 is separate from the pan 27. This pan 27 is formed with centralizing main lugs 28 diametrically opposite to one another and the intermediate lugs 29, and this pan is filled with ice or partially filled with ice as the case may be and the drum sits therein.

The fastening and locking device 30 is preferably a common fastening operated by the handle 31.

Figure 5:
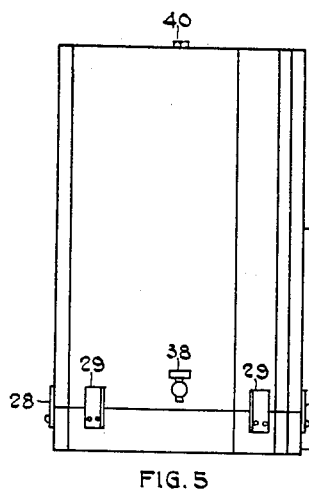
Figure 5 is an elevational view of the container adapted to sit on the pan and is a simpler form of the container illustrated in Figure 4.

In Figure 5 the drum 26 is just the same as in Figure 4 and also the pan 27 with the centralizing lugs, the only difference being that the fastener is not used.

Figure 6:
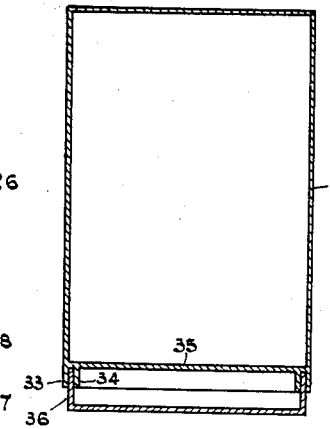
Figure 6 is an elevational view of a still simpler form of container and ice pan making up the unit.

In Figure 6 the drum 32 is of slightly different formation having the downwardly extending circular flanges 33 and 34 from the bottom 35, which form between them a recess into which the pan wall 36 extends, thereby tightly closing the pan by the introduction of suitable packing between the flanges 33 and 34, and maintaining a refrigerant chamber formed by the pan to all intents and purposes air-tight. A suitable fastening device may be added to this form of the invention if required.

The outlet 37 has the closure 38 made in each vessel towards the lower end of the wall, while the filling opening 39 is through the top of the vessel or drum, this filling opening being covered by the closure 40.

Figure 7:
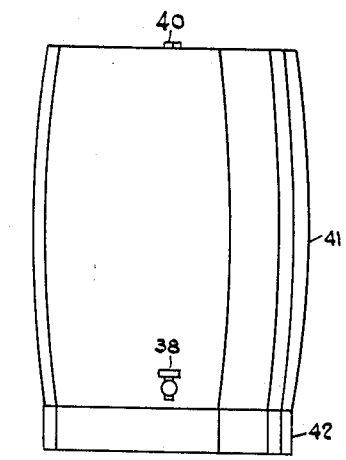
Figure 7 is an elevational view of the container in barrel shape.

In Figure 7 the only difference in the construction is that the vessel 41 is made in the shape of a barrel, though preferably of steel, and sits on a pan 42 or forms part therewith to form a refrigerant chamber at the bottom.

Briefly in the use of this invention, the vessel contains beer or other beverage or liquid and the refrigerant, mostly in the form of dry ice is contained within the compartment or pan at the bottom of the vessel, in fact on which the vessel itself sits or of which the vessel forms a part.

This ice in the most acceptable practice is introduced into the refrigerant chamber and shipped to the purchaser in that condition and may be used from time to time according to the demand, and as the beer is withdrawn through a suitable spigot, the beer which is unchilled from the top replaces the quantity withdrawn until all of the beer in the vessel is consumed.

This is really a new method of handling beer, which commends itself, both to the consumer and to the seller, for to the latter, his beer is always in the best condition and therefore almost surely to be in demand, especially in the warm weather when it is desirable to have a nice cold glass of beer and yet a large volume of the body of the beer remains for quite a while unchilled, which means that the beer itself does not suffer in quality from changing temperatures, neither is it likely to be overchilled.

It is hardly a paying proposition in this invention to use a refrigerant, which is mechanically produced, though it can be done, especially while the beer is being consumed from day to day. However dry ice is considered the most suitable refrigerant, though ordinary ice may be used with advantage.

What we claim is:—

A container and cooler comprising a container having a top and bottom, and an extension wall extending beyond the bottom, and having a groove therein, an outer bottom having a flange engaging with the groove of the extension wall and enclosing the same and forming a refrigerant chamber; a filling inlet leading through the top of the container and having a closure and an outlet having a closure leading into the container adjacent to the bottom thereof.

ERNEST JOSEPH D'AOUST.
HERBERT LAWRENCE DICKENS.